United States Patent
Shetty et al.

(10) Patent No.: US 11,538,483 B2
(45) Date of Patent: Dec. 27, 2022

(54) TASK REDIRECTION BY A VOICE ASSISTANT

(71) Applicant: VMware, Inc., Palo Alto, CA (US)

(72) Inventors: Rohit Pradeep Shetty, Bangalore (IN); Suman Aluvala, Bangalore (IN)

(73) Assignee: VMWare, INC., Palo Alto, CA (US)

( * ) Notice: Subject to any disclaimer, the term of this patent is extended or adjusted under 35 U.S.C. 154(b) by 192 days.

(21) Appl. No.: 16/829,193

(22) Filed: Mar. 25, 2020

(65) Prior Publication Data

US 2021/0304772 A1 Sep. 30, 2021

(51) Int. Cl.
*G10L 15/32* (2013.01)
*G10L 15/22* (2006.01)
*G06Q 10/10* (2012.01)
*H04L 9/40* (2022.01)
*H04L 67/306* (2022.01)

(52) U.S. Cl.
CPC ............ *G10L 15/32* (2013.01); *G06Q 10/103* (2013.01); *G10L 15/22* (2013.01); *H04L 63/08* (2013.01); *H04L 67/306* (2013.01); *G10L 2015/223* (2013.01); *G10L 2015/225* (2013.01)

(58) Field of Classification Search
CPC ... G06F 3/167; G10L 2015/223; G10L 15/22; G10L 17/22; G10L 15/26; G10L 15/30
See application file for complete search history.

(56) References Cited

U.S. PATENT DOCUMENTS

| | | | | |
|---|---|---|---|---|
| 9,172,747 | B2 * | 10/2015 | Walters | G06Q 30/02 |
| 10,685,652 | B1 * | 6/2020 | Cherukuri | G10L 17/00 |
| 2014/0244712 | A1 * | 8/2014 | Walters | G06F 3/167 |
| | | | | 709/202 |
| 2016/0179464 | A1 * | 6/2016 | Reddy | G06F 3/167 |
| | | | | 715/728 |
| 2016/0189717 | A1 * | 6/2016 | Kannan | G10L 15/26 |
| | | | | 704/275 |
| 2017/0076720 | A1 * | 3/2017 | Gopalan | G10L 15/22 |
| 2020/0105273 | A1 * | 4/2020 | O'Donovan | G10L 15/30 |
| 2020/0135200 | A1 * | 4/2020 | Taparia | G06F 3/167 |
| 2021/0200598 | A1 * | 7/2021 | Barczyk | G06F 9/505 |
| 2021/0335356 | A1 * | 10/2021 | Burakov | G10L 15/22 |

\* cited by examiner

*Primary Examiner* — Mark Villena (74) *Attorney, Agent, or Firm* — Thomas | Horstemeyer, LLP (57) ABSTRACT

Disclosed are various aspects of postponing or migrating tasks from a first assistant device to another assistant device. In some examples, an assistant device can facilitate task completion. Tasks can be recommended for postponement based upon the complexity of the task, a historical user profile, or the location of the assistant device.

20 Claims, 4 Drawing Sheets

TASK REDIRECTION BY A VOICE ASSISTANT

BACKGROUND

In an enterprise setting, individuals can utilize a number of different services and applications in order to complete tasks or actions of an enterprise workflow or to complete other tasks. Some devices used for enterprise workflows are activated using voice commands that can be obtained using a voice assistant running on an assistant device. An assistant device can be a smart speaker that has a speaker and one or more microphones to obtain spoken commands from a user. Some assistant devices can also be equipped with a display that may or may not be a touchscreen. Some assistant devices can also have an additional input device such as a keyboard or mouse.

Users can authenticate their identities to an assistant device and perform various tasks. For example, a user can log into an assistant device and ask the assistant to read his or her emails, assist with filling out a form, or complete another task. The assistant might access a task list or a to-do list of the user and begin assisting the user with completion of these tasks. The nature of voice interactions with a computer can create situation where user frustration occurs. For example, the speech-to-text transcription might encounter errors for a certain user. As another example, certain tasks might be better suited for completion with a different type of input device. Voice assistants typically fail to offer alternative methods for completing a task and can often simply abandon completion of the task, resulting in even more user frustration.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to dynamically assisting a user with task completion using a voice assistant. A voice assistant can represent an application or service that is executed by an assistant device. The voice assistant can obtain voice commands from a user and play back information through a speaker system that is translated to speech by a text-to-speech engine that is running on or on behalf of the voice assistant. In some cases, the voice assistant can utilize other capabilities of a device on which it is running if they are available, such as a display, a touchscreen input device, a keyboard, mouse, or other input device.

An assistant device can represent a smart speaker that includes a speaker system and a microphone system. An assistant device can also represent a smart display that also includes a display capability in addition to audio capture and playback capabilities. In some cases, the display of such a device might be a touchscreen that allows user interaction with the assistant device. The assistant device can also represent a smartphone or computer that has various input devices as well as audio and video playback capabilities In a voice enabled enterprise, office environments might be equipped with various types of assistant devices in common areas or on private offices. These assistant devices can be smart speakers or smart displays with which a user can authenticate and perform various tasks. For example, the user can ask the voice assistant on an assistant device to read his or her tasks from a to-do list. As another example, the user can ask the voice assistant to read information about his or her upcoming calendar appointments.

Assistants might exist on smart speakers, smart phones, smart displays, appliances, meeting room equipment, or other smart devices or fixtures in an enterprise environment. Even though voice is a natural way of communicating that most users enjoy, voice assistants are restricted by their respective differing capabilities. For example, some devices might have no display and no tactile input device, while others may have both, which varies the difficulty of completing tasks using an assistant device.

Users in an enterprise setting might utilize an enterprise skill to complete tasks, such as consuming email, sending email, assigning tasks to other users, completing tasks assigned by other users, and performing other actions that, in some cases, are easy to perform using voice interactions. For example, a voice assistant running on an assistant device might read aloud the users unread emails and allow the user to archive, delete, and/or compose new emails using voice interactions.

Some users might be better suited to using voice interactions to complete tasks due to their experience with utilizing voice assistants than other users who might not be experienced. Additionally, some users might have a history of frustration when using a voice assistant to dictate or to complete more complex tasks. Accordingly, certain users might be comfortable utilizing a voice assistant for certain interactions while other users may not. Additionally, using voice as an interface to handle tasks where humans often rely on a visual component to understand the context of the task also makes task completion using voice interactions difficult.

Accordingly, examples of the disclosure can redirect a user who is commencing tasks on a first assistant device with a certain set of capabilities or in a certain location in proximity to a second assistant device that may have a different set of capabilities in a different location.

Figure 1:
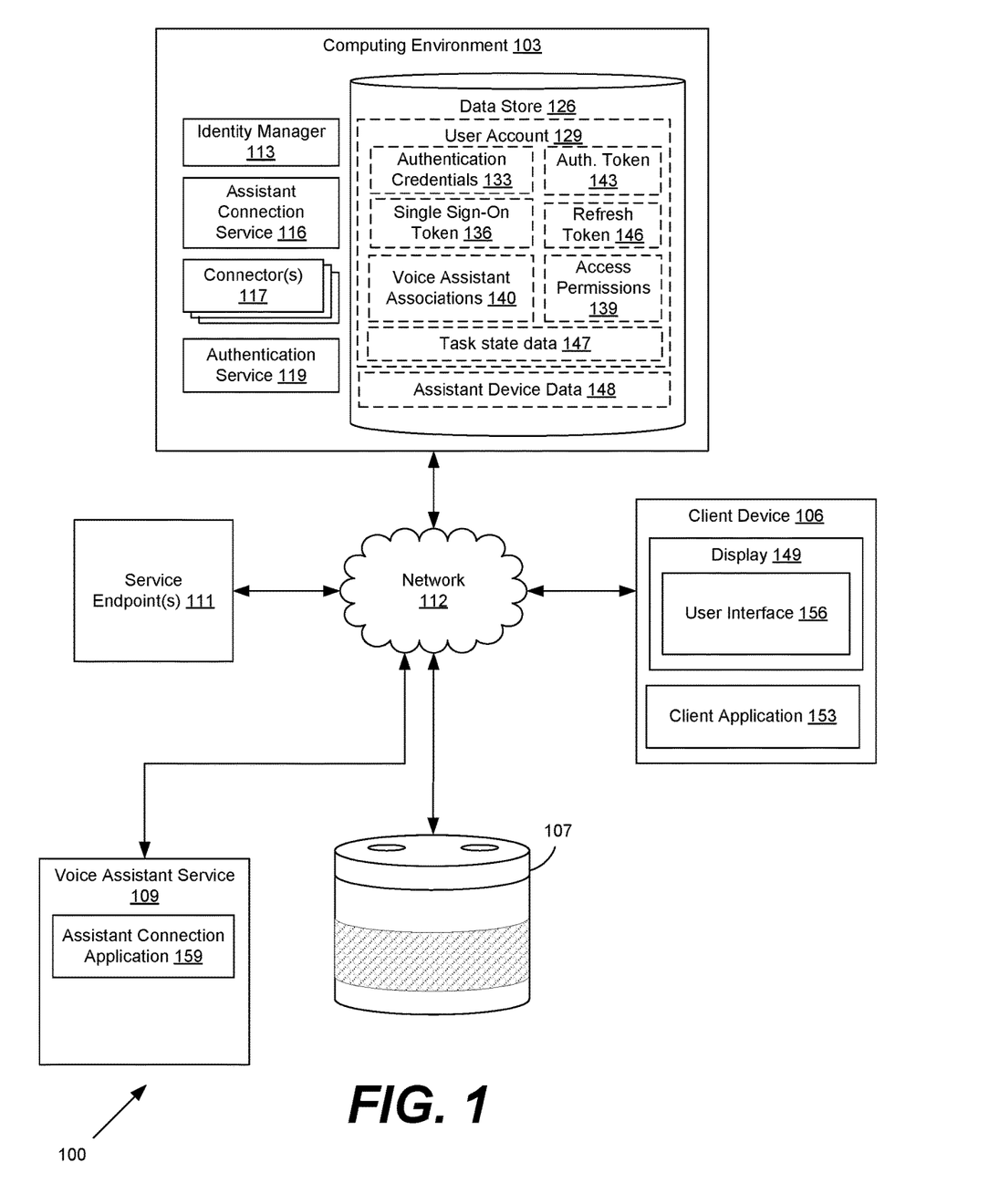
FIG. 1 is a drawing of an example of a networked environment including a workflow service, voice-activated device, a personal client device, and other components in communication through a network.

Beginning with FIG. 1, shown is an example of a networked environment 100. The networked environment 100 includes a computing environment 103, a client device 106, a assistant device 107, a voice assistant service 109, and one or more service endpoints 111, which are in data communication with each other across a network 112. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, an assistant connection service 116, one or more connectors 117, and an authentication service 119. In some examples, one or more service endpoints 111 can also be executed in the computing environment 103 in the case of service endpoints that are provided by the enterprise on the same computing resources of the enterprise. In some embodiments, however, one or more of the service endpoints 111 can be executed in a separate computing environment that is in communication with the computing environment 103 across the network 112.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the assistant connection service 116, the connector(s) 117, the authentication service 119, and one or more of the service endpoints 111, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more service endpoints 111. Examples of identity managers 113 include VMWARE's Identity Manager, Workspace ONE, or MICROSOFT's Active Directory Federation Services.

The authentication service 119 can retrieve and cache authentication data, such as authentication tokens 143 and refresh tokens 146, provided by various service endpoints 111. The cached authentication data can be used by the assistant connection service 116 to query the service endpoints 111 for information.

The assistant connection service 116 can facilitate authentication of users who are using an assistant device 107 with the identity manager 113. Additionally, the assistant connection service 116 can enable users to retrieve information from one or more service endpoints 111 for playback by a assistant device 107. The assistant connection service 116 can also allow users to perform one or more tasks associated with a user account 129 of the user. The functionality of the assistant connection service 116 can also be implemented within a service endpoint 111. The assistant connection service 116 can act as a server or backend service to obtain user-specific data for an assistant connection application 159 that is implemented as a skill or application within a voice assistant ecosystem.

For example, as a user makes a query with a hotword associated with the assistant connection application 159 to a assistant device 107, the assistant connection application 159 can obtain a speech-to-text representation of the query and provide the representation to the assistant connection service 116. The assistant connection service 116 can obtain user-specific data on behalf of a user account 129 and respond to the assistant connection application 159 with data that can be played back through the assistant device 107.

A connector 117 can provide a standardized mechanism for the assistant connection service 116 to communicate with a service endpoint 111. Each service endpoint 111 may provide an application programming interface (API) for communicating, querying, or otherwise interacting with the service endpoint 111, which can include different methods or functions with different parameters compared to other service endpoints 111. This can allow for the assistant connection service 116 to send a single, uniformly formatted query to one or more connectors 117. Each connector 117 is then responsible for using the information provided in the query from the assistant connection service 116 to invoke the appropriate functions provided by the API of the service endpoint 111. To add support for a new service endpoint 111, a new connector 117 can be created without needing to modify the assistant connection service 116 itself. Likewise, if a change is made to the API of the service endpoint 111, the connector 117 between the assistant connection service 116 and the federated service can be updated without having to modify the assistant connection service 116 itself.

A service endpoint 111 can be web application, web service, or other network facing application that can be accessed using a shared identity manager 113. A service endpoint 111 can also provide its own authentication flow or mechanism rather than rely upon a shared identity manager 113. One or more service endpoints 111 can be provided by the same provider or by different providers.

The user account 129 represents information associated with a user. The information can include one or more authentication credentials 133, one or more single sign-on tokens 136, and/or one or more access permissions 139 applied to the user account, as well as cached authentication tokens 143 and refresh tokens 146. Voice assistant associations 140 can specify one or more assistant devices 107 that are associated with a user account 129 and with which a user has authenticated. Once a voice assistant association 140 is established by a user, the assistant connection service 116 can provide data from a service endpoint 111 for playback by the assistant device 107. Other information about the user can also be stored as part of the user account 129, such as the user's name or contact information.

The user account 129 can house data about past or historical interactions with assistant devices 107 by the user. The data can include a previous or historical error rate associated with speech-to-text transcriptions performed by or on behalf of the assistant device 107 for the user. An error rate can be calculated by determining how often a user corrects a speech-to-text transcription performed by the assistant device 107. The user account data can also house information about how many times or how often a user abandons or postpones a task being performed using the assistant device 107. In some examples, the assistant connection service 116 or assistant connection application 159 can perform a sentiment analysis on voice data captured by the assistant device 107 to detect a user frustration level when performing tasks using the assistant device 107. A historical frustration level or frustration rate can be associated with the user account 129. The above information can be utilized to determine whether a suggestion to postpone or migrate a task to another assistant device 107 should be generated for a particular user performing a task.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide a client device 106 access to various service endpoints 111 on behalf of the authenticated user. Additionally, the SSO token 136 can be used by the assistant connection service 116 to access various service endpoints 111 on behalf of the authenticated user and a assistant device 107 associated with the user. In some instances, such as those implementing a version of the KERBEROS protocol, a separate SSO token 136 can be generated for each service endpoint 111 that the client device 106 attempts to access on behalf of the user. In other instances, the single SSO token 136 can be generated and used to provide the client device 106 with access to several of the service endpoints 111. Although each of the service endpoints 111 can have a different set of authentication credentials 133 linked to the user account 129, such as a different user name and password combination, the SSO token 136 allows the user to authenticate once with the identity manager 113 in order to use each of the service endpoints 111 instead of having to authenticate with each of the service endpoints 111 separately.

The access permissions 139 represent computing resources that the user account is authorized to access. For example, the access permissions 139 can indicate that a user account is permitted to access some service endpoints 111 but is prohibited from accessing other service endpoints 111. As another example, the access permissions 139 can indicate that the user account 129 can access certain features of a service endpoint 111 but prohibited from accessing other features. For example, if one of the service endpoints 111 that a user was permitted to access was a customer relationship management (CRM) service, the user might have permission to access his or her own contacts but be prohibited from accessing the sales contacts of other users. The access permissions 139 can also specify whether a user account 129 is entitled to access a particular service endpoint 111 through a assistant device 107. Some users may be entitled to access the data from a service endpoint 111 through a assistant device 107 whereas other users in an enterprise may not.

An authentication token 143 is a token provided by one of the service endpoints 111 in response to a successful authentication with the service endpoint 111. The authentication token 143 represents that a user account 129 is currently authenticated by the service endpoint 111 and authorized to access or otherwise interact with the service endpoint 111 in some capacity. For security purposes, the authentication token 143 often has a time-limit associated with it, such as 1 hour, 3 hours, 6 hours, 8 hours, or some other period of time). Once the time-limit has expired, the authentication token 143 can no longer be used to prove current authentication status of the user account 129 with the service endpoint 111. The authentication token 143 can be provided, for example, as part of an authentication exchange using a version of the OAUTH protocol.

A refresh token 146 is a token provided by one of the service endpoints 111 in response to a successful authentication with the service endpoint 111. The refresh token 146 can be used to acquire a new authentication token 143 once a current or previous authentication token 143 expires. The refresh token 146 often has a much longer time-limit associated with it, such as 1 day, 1 week, 30 days, 3 months, or 1 year, which allows for the refresh token 146 to be used to acquire a series of authentication tokens 143 after an initial successful authentication. If a user's access is revoked, the refresh token 146 can be marked invalid, preventing the refresh token 146 from being used to acquire new authentication tokens 143. The refresh token 146 can be provided, for example, as part of an authentication exchange using a version of the OAUTH protocol.

Task state data 147 represents the state of a task that is suspended or postponed by user on an assistant device 107. The task state data 147 can represent a partially completed form data associated with a form that a user might have begun filling using voice interactions through the assistant device 107 but then elected to postpone or suspend. When the user resumes the task on another assistant device 107, the task state data 147 can contain information about the task and the partially completed form data. As another example, if the user is dictating an email or a message using voice interactions on the assistant device 107 and elects to postpone or suspend the task, the task state data 147 can contain the state of the message so that the state can be obtained by another assistant device 107 when the task is resumed.

Assistant device data 148 can store information about assistant devices 107 that are in the enterprise and/or managed by the enterprise. The assistant device data 148 can include information about the location of an assistant device 107 within the enterprise. The location information can also include metadata, such as a noise level of the location or whether the location is in a public or a private location in the enterprise. The assistant device data 148 can also include information about the capabilities of an assistant device 107. This data can specify whether an assistant device 107 has a display, a touchscreen input device associated with the display, a keyboard, a mouse, a microphone, or other capabilities. The assistant connection service 116 or assistant connection application 159 can utilize the location and capability data to determine whether it is appropriate to generate a recommendation to postpone or suspend a task.

Each service endpoint 111 can be associated with a federated user account. A user with a user account 129 may also have multiple federated user accounts. For example, a user may have one federated user account for each service endpoint 111 that the user is registered or enrolled with. As another example, the user may have multiple federated user accounts for a service endpoint 111 (e.g., a personal federated user account and a separate federated user account for business or professional purposes). The federated user account can be associated with an SSO token 136 and an authentication token 143.

The client device 106 is representative of a plurality of client devices 106 that can be coupled to the network 112. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface 156 to be rendered on the display 149. The client application 153 can represent various types of applications executable by the client device 106. For example, the client application 153 could be a web browser and the user interface 156 could include a web page rendered within a browser window. As another example, the client application 153 could be an email application and the user interface 156 could represent a graphical user interface for viewing, editing, and composing emails.

Additionally, the client application 153 can represent an application that implements an assistant functionality that enables the client device 106 operate as an assistant device. The application can utilize the microphone, speakers, and input device capabilities of the client device 106 to operate as an assistant device like a dedicated assistant device 107 can.

The assistant device 107 represents a smart speaker, smart display, or any device that has a microphone and audio playback capability to provide a voice assistant experience. A voice assistant experience means an experience in which a user can provide spoken commands or requests that are captured by one or more microphones integrated with or in communication with the assistant device 107, and the assistant device 107 play back audio using a speaker in response to the spoken commands or requests. For example, a user can ask the assistant device 107 to play music or retrieve information from the Internet, and the assistant device 107 can cause playback of the requested music or information through an integrated speaker or an audio playback device in communication with the assistant device 107.

The voice assistant service 109 can communicate with the assistant device 107 to process voice commands and facilitate retrieval of information for playback through the assistant device 107. The voice assistant service 109 can perform voice recognition or speech-to-text conversion on audio captured by the assistant device 107, identify a command or action to perform in response to the captured audio, and response to the assistant device 107 audio that should be played back through the assistant device 107. The voice assistant service 109 can also provide an API so that third parties can create applications or extend the capabilities of the assistant device 107. These applications or capabilities can be implemented within a cloud-based voice assistant service 109 so that the functionality does not need to be implemented within every assistant device 107 that is deployed for extended capabilities to be available to every user.

In the context of this disclosure, the assistant connection application 159 can facilitate authentication of a user with the assistant connection service 116 using the assistant device 107. Upon authentication, the assistant connection application 159 can retrieve data, such as task data, from the assistant connection service 116 or service endpoints 111 and cause at least a portion of the data to be played back through the assistant device 107. Accordingly, various commands can be implemented in the assistant connection application 159, such as commands to retrieve or make changes to data in a user's task list, calendar, email, or other federated services.

Also in the context of this disclosure, any functionality discussed as being performed by the assistant connection application 159 or assistant connection service 116 can be performed in a single application or service. Additionally, any functionality discussed as being performed by the assistant connection application 159 can be performed instead by the assistant connection service 116 or vice-versa.

Next, a general description of the operation of the various components of the networked environment 100 is provided. To begin, a user can authenticate his or her identity to the assistant device 107. Authentication can be performed using a client application 153, a user's voice signature, a passphrase, or another authentication mechanism that can authenticate the user's identity with the identity manager 113.

Once authenticated, the user can ask to perform one or more tasks using the assistant device 107. For example, the user can ask the assistant device 107 to play back one or more unread emails. Accordingly, the assistant connection application 159 can request the assistant connection service 116 to retrieve a number of unread or priority emails in the user's inbox that can be transcribed to speech for playback by the assistant device 107. The assistant connection service 116 can obtain one or more emails from a service endpoint 111 providing email services on behalf of the enterprise. The assistant connection service 116 can provide information about the emails, such as the sender, the subject, and body text, to the assistant connection application 159. The assistant connection application 159 can then cause the assistant device 107 to play back one or more of the emails.

The assistant connection application 159 can also permit the user to compose emails or replies to emails using voice interactions through the assistant device 107. For example, upon reading the text of an email message, the assistant connection application 159 can cause the assistant device 107 to prompt the user to compose a reply or to move onto the next email message. If the user wishes to compose a reply, the assistant connection application 159 can facilitate composition of the email through voice interactions with the user.

The assistant connection application 159 can assist the user with completion of other tasks, such as sending an instant message, filling a webform, a timecard, or other data entry tasks. The assistant connection application 159 can also determine, based upon the complexity of a task, the capabilities of an assistant device 107, the location of the assistant device 107, or information about a user account 129, that a recommendation to postpone or migrate the task to another assistant device 107 should be generated and given to the user.

For example, if the assistant device 107 from which the task is being performed does lacks a display, a keyboard, or a touchscreen input device, the assistant connection application 159 or assistant connection service 116 can generate a suggestion signal that a task requiring data entry should be postponed if the complexity of the task or a user's historical interactions with assistant devices 107 warrant such a recommendation. In this scenario, the assistant connection application 159 can cause the assistant device 107 to play back a query asking the user if they wish to postpone the task or move onto a different task. If the user responds affirmatively, the assistant connection application 159 can cause the completion state of the task to be saved in the user account 129 of the user as task state data 147.

Should a task be postponed, the assistant connection application 159 can query the user to resume the task when a user authenticates his or her identity on another assistant device 107. In some examples, the assistant connection application 159 can query the user to resume the task only when a user authenticates his or her identity on another assistant device 107 with different capabilities than the first assistant device 107. For example, the different capabilities might include the addition of a display, a keyboard, or a touchscreen input device.

There are various scenarios in which the assistant connection application 159 or assistant connection service 116 can generate a suggestion signal to postpone or migrate a task that a user is attempting to perform using an assistant device 107. In one example, historical usage data associated with a user account 129 can be consulted. The historical usage data can include a historical error rate in speech-to-text transcriptions that are associated with the user. In some embodiments, for previous voice interactions by the user, a cumulative or average error rate can be tracked. An error can be identified if or when a user corrects a speech-to-text transcription made by the assistant connection application 159.

In another example, a historical user frustration score can be maintained for users that tracks a historical frustration level that the user has in performing tasks using his or her voice through an assistant device 107. A historical user frustration score can be accumulated or calculated using a sentiment analysis that can be performed on voice interactions with the assistant device 107 or using an error rate that is calculated on the voice interactions. A voice interaction can be assigned a frustration score that indicates high frustration if the sentiment analysis reveals user frustration for a particular voice interaction. A voice interaction can be assigned a frustration score that indicates high frustration if a voice interaction encounters an error that requires user correction.

A voice interaction can be assigned a frustration score that indicates lower frustration if a voice interaction does not encounter an error or if the sentiment analysis does not indicate user frustration. Accordingly, the assistant connection application 159 can recommend postponing or migrating a task to an assistant device 107 that requires data entry if the historical user frustration score indicates a historical frustration level experienced by the user that exceeds a threshold. The threshold can be a threshold score based upon a statistical measure of frustration experienced a user population within the enterprise or by an aggregated measure calculated across many enterprises.

In another example, the assistant connection application 159 can generate a suggestion signal to postpone or migrate the task if a task being attempted through the assistant device 107 requires or would benefit from displaying media on a display or utilizing an input device other than a microphone. For example, if an email includes or links images, attachments, videos, or other visual elements, the assistant connection application 159 generate a suggestion signal to postpone or migrate the task from an assistant device 107 without a display to an assistant device 107 that does. As another example, if a task includes data entry, the assistant connection application 159 generate a suggestion signal to postpone or migrate the task from an assistant device 107 without a display and without an input device to an assistant device 107 that does.

In another example, the assistant connection application 159 can generate a suggestion signal to postpone or migrate the task if a task being attempted through the assistant device 107 would benefit from being postponed to an assistant device 107 that is located in a different location in the enterprise. For example, if a task being attempted by the user would require sensitive data to be read aloud by the assistant device 107, and the assistant device 107 is in a public area within an enterprise, the assistant connection application 159 can generate a suggestion signal to relocate or postpone the task. The task can be postponed until the user logs into or authenticates with an assistant device 107 that is in a private location. The assistant connection application 159 can leverage the location data associated with assistant devices 107 that is maintained by the enterprise. Additionally, for certain tasks that involve personal information or other sensitive data, the assistant connection application 159 can generate a recommendation that the task be completed on the user's smartphone, computer, or a device that is assigned to the user rather than an assistant device 107 that is accessible to other users in the enterprise. The location data can categorize the location of an assistant device 107 as public, private, secure, or insecure.

In another example, the assistant connection application 159 can generate a suggestion signal to postpone or migrate the task if the assistant connection application 159 detects that the user is in a noisy location with a background noise level that exceeds a noise threshold. For example, if a task being attempted by the user requires voice interactions and the noise level detected by the microphones of the assistant devices 107 are higher than a noise threshold, the task can be postponed until the user logs into or authenticates with an assistant device 107 that is in a quieter location.

To generate a decision about whether to postpone or migrate a task, the assistant connection application 159 can feed the suggestion signals into a machine learning process that arrives at a decision to cause the assistant device 107 to suggest postponement of the task to the user. Additionally, the assistant connection application 159 can generate a reminder to the user about a postponed task when the user logs into an assistant device 107 that has additional capabilities or is in a different or more appropriate location.

Additionally, the data regarding task postponement or migration can feed into a process that provides suggestions on where to place additional or current assistant devices 107 in the enterprise. For example, if tasks are often postponed on an assistant device 107 in a particular location in the enterprise, the assistant connection application 159 can generate a suggestion to move the assistant device 107 for an administrator.

The assistant connection application 159 can be invoked by the user through a keyword spoken by the user. For example, the user can speak "Assistant, please open enterprise workspace." The keyword "enterprise workspace," or any other keyword, can be associated with the assistant connection application 159 within the assistant ecosystem. When the user invokes the assistant functionality on the assistant device 107 and speaks a particular keyword, the assistant connection application 159 can be launched by voice assistant service 109.

Once invoked, the assistant connection application 159 can facilitate voice interactions between the user and the assistant device 107. The assistant connection application 159 can suggest tasks appropriate for the user's location or the user's historical frustration score based on uncompleted tasks queued for the user or the user's historical success in completing tasks using the assistant device 107. For example, if a user has a history of never or rarely completing tasks through an assistant device 107, the assistant connection application 159 might not generate a recommendation to resume or perform a task on an assistant device 107.

Figure 2:
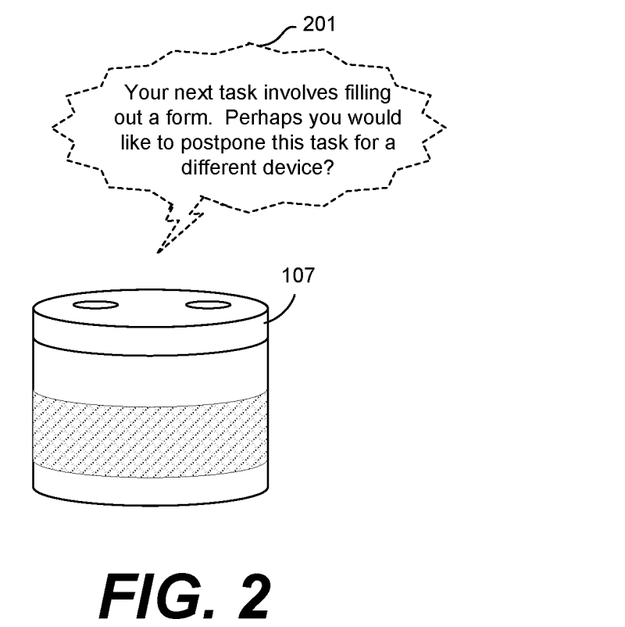
FIG. 2 illustrates a scenario according to one example of the disclosure.

Referring next to FIG. 2, shown is a scenario that illustrates how interactions between a user and an assistant device 107 can operate. In the scenario shown, the user has invoked the functionality in the assistant device 107 that is provided by the assistant connection application 159. Again, the assistant connection application 159 can be implemented using APIs provided by an assistant platform on which the assistant device 107 runs. The assistant connection application 159 can be implemented as a third party application, skill, or capability of the assistant device 107 that extends the capability of the assistant device 107 to enable users to obtain data from service endpoints 111 associated with the user account 129.

In FIG. 2, the user has asked the assistant device 107 to commence execution of one or more tasks associated with the user. Tasks can be detected by the assistant connection service 116 by retrieving data from one or more service endpoints 111 and converting them into voice interactions. For example, if the user has unread emails, a calendar appointment, an item on a to-do list, or action items assigned to them in other services (e.g. bug tracking services, customer relationship management systems, etc.), the assistant connection application 159 can read content from the items aloud and query the user for a response or a follow-up action that can be taken on the user's behalf in the respective service endpoint 111 from which the item was retrieved.

In the scenario of FIG. 2, the user has authenticated his or her identity, or access to a user account 129, through the assistant device 107. The user has initiated voice interactions with the assistant device 107 to complete one or more tasks. The assistant connection application 159 has determined to recommend postponement of a particular task. As noted above, the assistant connection application 159 can generate a recommendation to postpone the task due to the user's historical difficulty or frustration with completing tasks on an assistant device 107, a historical error rate associated with the user's attempts to complete tasks, complexity of the task, location of the assistant device 107, or a combination of the above and other factors.

In the scenario of FIG. 2, the assistant connection application 159 causes the assistant device 107 to query the user about whether they want to postpone the task for completion on another assistant device 107. The user can be queried by playback of a message 201. If the user confirms that he or she would like to postpone the task, the assistant connection application 159 can save the completion state of the task in the user account 129. The assistant connection application 159 can provide the completion state to the assistant connection service 116, which can save the completion state as task state data 147.

Figure 3:
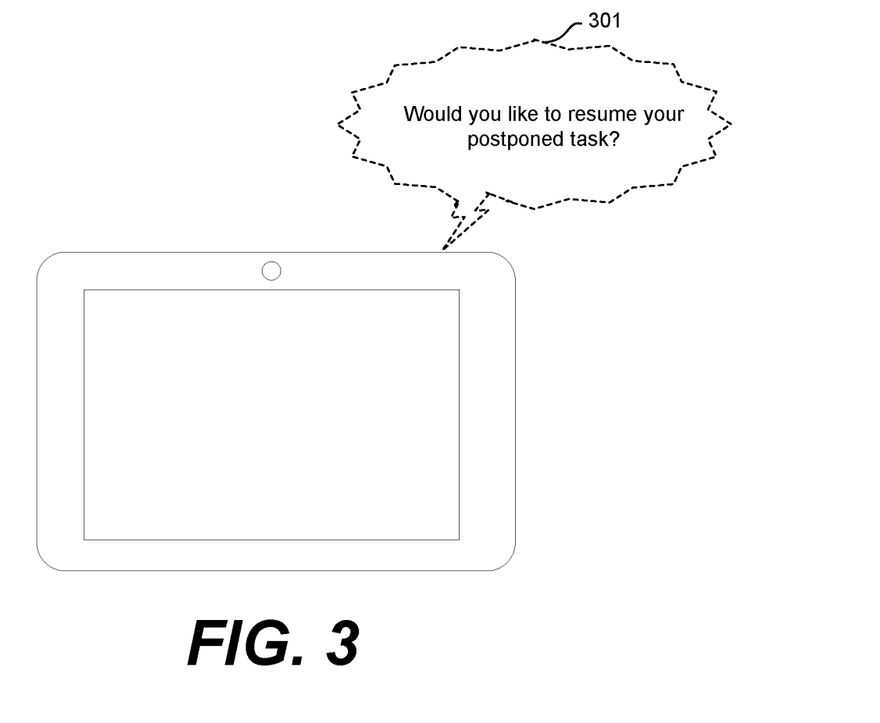
FIG. 3 illustrates a scenario according to one example of the disclosure.

Continuing the scenario of FIG. 2, reference is now made to FIG. 3. In FIG. 3, the user has authenticated his or her user identity on a different assistant device 107. The assistant device 107 in FIG. 3 has different capabilities than the assistant device 107 of FIG. 2. Accordingly, the assistant connection application 159, upon authenticating the user, can retrieve task state data 147 of postponed tasks from the user account 129. The task state data 147 can store the completion status of the task when postponed, such as data filled into forms or the amount of an email or other content that the assistant connection application 159 has read.

The assistant connection application 159 can cause a message 301 to be played back by the assistant device 107. The message 301 can query the user about whether they would like to resume tasks that were postponed and saved in task state data 147. If the user responds affirmatively, the assistant connection application 159 can retrieve the completion state of the task from task state data 147 and resume the task on behalf of the user.

Figure 4:
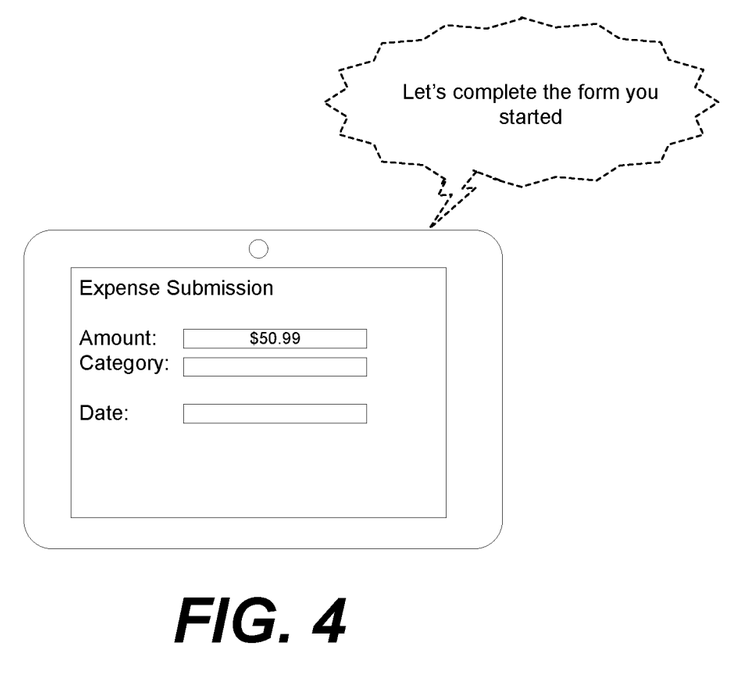
FIG. 4 illustrates a scenario according to one example of the disclosure.

Referring next to FIG. 4, the user has requested to resume the task from the other assistant device 107. The assistant connection application 159, in response to receiving an affirmative response to message 301 (FIG. 3), can retrieve the completion state of the task from task state data 147 and resume the task. Because the assistant device 107 has additional capabilities compared to the assistant device 107 of FIG. 2, such as a display, the assistant connection application 159 can utilize the display and other additional capabilities to facilitate completion of the task. In the example shown, the assistant connection application 159 can utilize the display of the assistant device 107 to facilitate a data entry task, such as form filling. If the task involves display of media or data entry, the assistant connection application 159 can utilize a touchscreen display or a keyboard to obtain input from the user to facilitate completion of the task.

Figure 5:
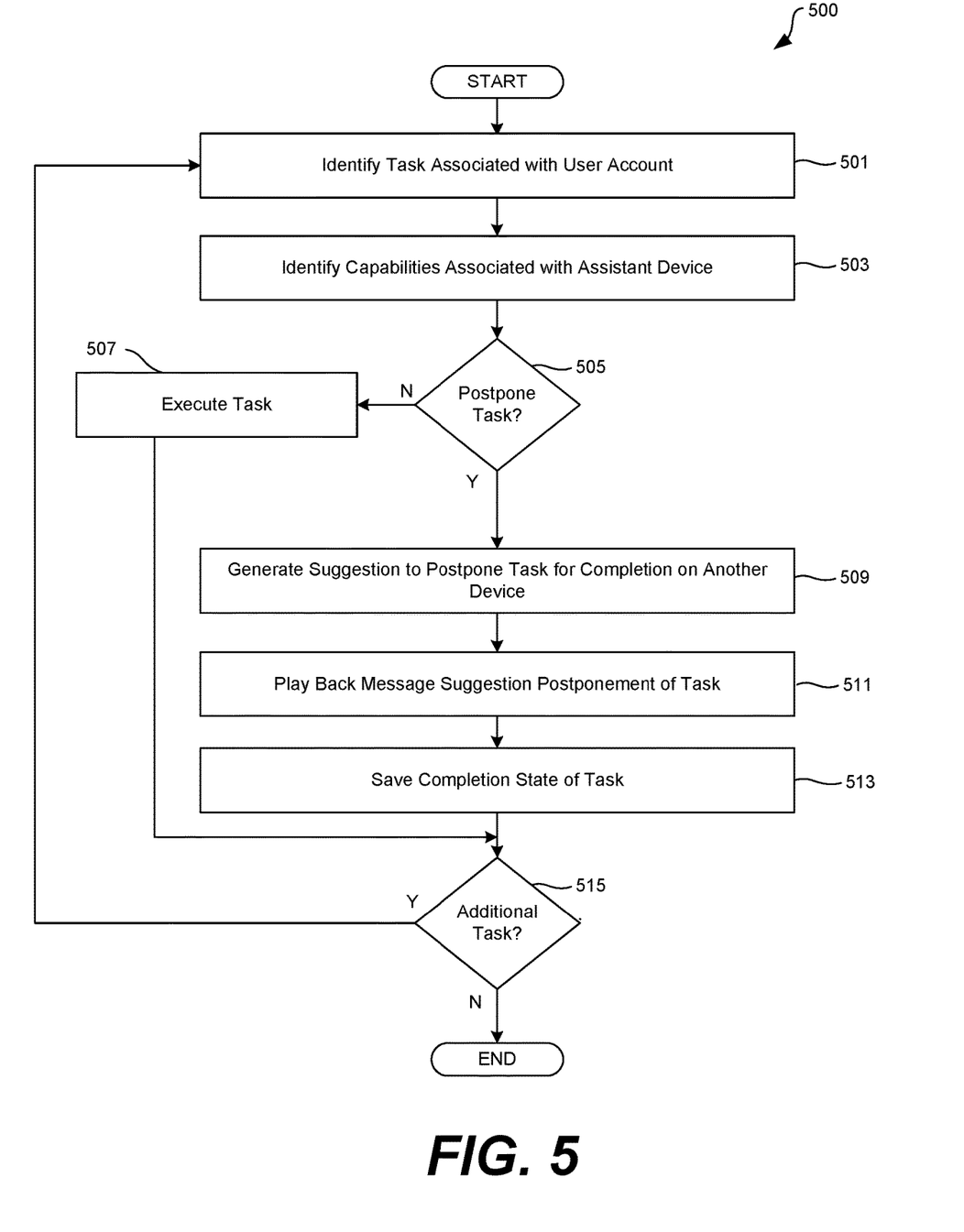
FIG. 5 is a flowchart outlining functionalities implemented in the networked environment.

FIG. 5 is a flowchart 500 depicting an example of the operation of a portion of the assistant connection application 159. It is understood that the flowchart of FIG. 5 provides merely an example of the many different types of functional arrangements that can be employed to implement the portion of the assistant connection application 159 as described herein. As an alternative, the flowchart of FIG. 5 can be viewed as depicting an example of elements of a method implemented by the assistant connection application 159 in some implementations. It should be noted that any functionality described herein as being implemented by the assistant connection application 159 can be performed by the assistant connection service 116 or vice-versa. The flowchart shown in FIG. 5 illustrates how the assistant connection application 159 can postpone or migrate a task to another assistant device 107. The flowchart of FIG. 5 also assumes that the user has previously authenticated with the identity manager 113 using the assistant device 107.

Beginning at step 503, the assistant connection application 159 can identify an uncompleted task associated with the user who has authenticated with the assistant connection application 159 using the assistant device 107. An uncompleted task can include unread emails, messages, items from a task list, or a third-party service. Uncompleted tasks can be those that are compatible with an assistant device 107 and can be completed using voice interactions or other capabilities of an assistant device 107 through which a user can authenticate.

Next, at step 503, the assistant connection application 159 can identify capabilities associated with the assistant device 107. In some instances, the assistant connection application 159 can determine based upon the capabilities of the assistant device 107 on which the user has authenticated that a task should be postponed. Therefore, the assistant connection application 159 can determine the device's capabilities. In one example, the capabilities can be determined by querying the device or a device record associated with the assistant device 107 using APIs provided by the assistant ecosystem. In another example, if the assistant device 107 is a managed device, the capabilities of the assistant device 107 can be determined from metadata associated with the device in a management device record.

At step 505, the assistant connection application 159 can determine whether the task should be postponed or migrated to another assistant device 107. The assistant connection application 159 can make this determination based upon the capabilities of the assistant device 107, the complexity of the task, and a user history. As noted above, assessment of the complexity of the task can include whether the task involves data entry or display of media. Additionally, assessment of the complexity of the task can further include determining whether the task requires readout of a significant amount of content that might be more efficient or effective to convey using a visual medium. In this scenario, a word limit can be placed on an amount of content the assistant device 107 translates to speech for a particular task. The decision whether to postpone the task can be made by a machine learning process that is trained using user feedback data. In some examples, users can manually ask the assistant to postpone a particular task, which machine learning process can learn from in adapting its decision-making process.

If the assistant connection application 159 determines not to generate a recommendation to postpone the task, the process can proceed to step 507, where the assistant connection application 159 causes the assistant device 107 to proceed with completion of the task through voice interactions. Thereafter, the process can proceed to step 515, where the assistant connection application can determine if there are additional tasks identified for the user. If there are additional tasks, the process can return to step 501. If there are none, the process of FIG. 5 can proceed to completion. If the assistant connection application determines to generate a recommendation to postpone the task, the process can proceed from step 505 to step 509.

At step 509, the assistant connection application 159 has determined to generate a recommendation to postpone the task. Accordingly, at step 511, the assistant connection application 159 can cause the assistant device 107 to play back a message querying to user about whether the user would like to postpone the task for completion on another assistant device 107 or for completion outside of the assistant ecosystem. For example, the user might prefer to never have the assistant device 107 read out unread emails and messages. Accordingly, a user constantly postponing the task of reading aloud unread messages can train the machine learning process to always postpone such a task for a particular user.

At step 513, the assistant connection application 159 can save the completion state in the user account 129 of the user. The completion state can include the extent to which a particular postponed task has been completed so that it can be resumed on another assistant device 107 at a later time.

Thereafter, the process can proceed to step 515, where the assistant connection application can determine if there are additional tasks identified for the user. If there are additional tasks, the process can return to step 501. If there are none, the process of FIG. 5 can proceed to completion.

The flowchart of FIG. 5 shows examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 5 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or more processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

The invention claimed is:

1. A system, comprising:
   at least one computing device comprising at least one processor; and
   at least one memory comprising executable instructions, wherein the instructions, when executed by the at least one processor, cause the at least one computing device to at least:
   identify a task to be performed using a voice assistant on a first assistant device;
   identify a set of capabilities of the first assistant device;
   generate a suggestion signal that the task should be completed on the second assistant device based upon the set of capabilities, a past user interaction, or a complexity of the task;
   cause the first assistant device to play back a first message including a query to postpone the task in response to determining that the first assistant device lacks a hardware capability to complete the task to be performed using the voice assistant and in response to determining that the second assistant device possesses the hardware capability;
   save a completion state of the task in association with a user account of the user in response to a request to postpone the task;
   cause the task to be redirected to the second assistant device, wherein the hardware capability comprises a touchscreen display device; and
   cause the task to be resumed on the second assistant device using the completion state of the task saved in association with the user account.

2. The system of claim 1, wherein the instructions identify the second assistant device by identifying a second assistant device in proximity to a location of the first assistant device with a different set of capabilities than the first assistant device.

3. The system of claim 1, wherein the instructions further cause the at least one computing device to at least:
   obtain a request to authenticate the user account on a second assistant device;
   authenticate the user account on the second device;
   identify a postponed task associated with the user account;
   determine that the second assistant device has a different set of capabilities than the first assistant device, the different set of capabilities facilitating completion of the task; and
   cause the second assistant device to play back a second message including a query to complete the task.

4. The system of claim 3, wherein the instructions further cause the at least one computing device to at least:
   obtain a request to resume the task on behalf of the user;
   retrieve the completion state of the task from the user account;
   populate one or more fields associated with the task based upon the completion state; and
   cause the second assistant device to play back a third message including a prompt comprising a status of the task.

5. The system of claim 1, wherein the suggestion signal is based upon a historical error rate associated at least one past user interaction corresponding to the user account, wherein the historical error rate indicates an error rate that exceeds an error threshold.

6. The system of claim 1, wherein the suggestion signal is based upon a location of the first assistant device, wherein the location is associated with a noise level that exceeds a noise threshold.

7. The system of claim 1, wherein the suggestion signal is based the first assistant device lacking a display or keyboard to complete the task.

8. A non-transitory computer-readable medium comprising executable instructions, wherein the instructions, when executed by at least one processor, cause at least one computing device to at least:
   identify a task to be performed using a voice assistant on a first assistant device;
   identify a set of capabilities of the first assistant device;
   generate a suggestion signal that the task should be completed on the second assistant device based upon the set of capabilities, a past user interaction, or a complexity of the task;
   cause the first assistant device to play back a first message including a query to postpone the task in response to determining that the first assistant device lacks a hardware capability to complete the task to be performed using the voice assistant and in response to determining that the second assistant device possesses the hardware capability;
   save a completion state of the task in association with a user account of the user in response to a request to postpone the task;
   cause the task to be redirected to the second assistant device, wherein the hardware capability comprises a touchscreen display device; and
   cause the task to be resumed on the second assistant device using the completion state of the task saved in association with the user account.

9. The non-transitory computer-readable medium of claim 8, wherein the instructions identify the second assistant device by identifying a second assistant device in proximity to a location of the first assistant device with a different set of capabilities than the first assistant device.

10. The non-transitory computer-readable medium of claim 8, wherein the instructions further cause the at least one computing device to at least:
    obtain a request to authenticate the user account on a second assistant device;
    authenticate the user account on the second device;
    identify a postponed task associated with the user account;

determine that the second assistant device has a different set of capabilities than the first assistant device, the different set of capabilities facilitating completion of the task; and cause the second assistant device to play back a second message including a query to complete the task.

11. The non-transitory computer-readable medium of claim 10, wherein the instructions further cause the at least one computing device to at least:

obtain a request to resume the task on behalf of the user;

retrieve the completion state of the task from the user account;

populate one or more fields associated with the task based upon the completion state; and cause the second assistant device to play back a third message including a prompt comprising a status of the task.

12. The non-transitory computer-readable medium of claim 8, wherein the suggestion signal is based upon a historical error rate associated at least one past user interaction corresponding to the user account, wherein the historical error rate indicates an error rate that exceeds an error threshold.

13. The non-transitory computer-readable medium of claim 8, wherein the suggestion signal is based upon a location of the first assistant device, wherein the location is associated with a noise level that exceeds a noise threshold.

14. The non-transitory computer-readable medium of claim 8, wherein the suggestion signal is based the first assistant device lacking a display or keyboard to complete the task.

15. A method comprising:

identifying a task to be performed using a voice assistant on a first assistant device;

identifying a set of capabilities of the first assistant device;

generating a suggestion signal that the task should be completed on the second assistant device based upon the set of capabilities, a past user interaction, or a complexity of the task;

causing the first assistant device to play back a first message including a query to postpone the task in response to determining that the first assistant device lacks a hardware capability to complete the task to be performed using the voice assistant and in response to determining that the second assistant device possesses the hardware capability;

saving a completion state of the task in association with a user account of the user in response to a request to postpone the task;

cause the task to be redirected to the second assistant device, wherein the hardware capability comprises a touchscreen display device; and cause the task to be resumed on the second assistant device using the completion state of the task saved in association with the user account.

16. The method of claim 15, further comprising identifying the second assistant device by identifying a second assistant device in proximity to a location of the first assistant device with a different set of capabilities than the first assistant device.

17. The method of claim 15, further comprising:

obtaining a request to authenticate the user account on a second assistant device;

authenticating the user account on the second device;

identifying a postponed task associated with the user account;

determining that the second assistant device has a different set of capabilities than the first assistant device, the different set of capabilities facilitating completion of the task; and causing the second assistant device to play back a second message including a query to complete the task.

18. The method of claim 17, further comprising:

obtaining a request to resume the task on behalf of the user;

retrieving the completion state of the task from the user account;

populating one or more fields associated with the task based upon the completion state; and causing the second assistant device to play back a third message including a prompt comprising a status of the task.

19. The method of claim 15, wherein the suggestion signal is based upon a historical error rate associated at least one past user interaction corresponding to the user account, wherein the historical error rate indicates an error rate that exceeds an error threshold.

20. The method of claim 15, wherein the suggestion signal is based upon a location of the first assistant device, wherein the location is associated with a noise level that exceeds a noise threshold.

* * * * *